United States Patent [19]

Tanaka et al.

[11] Patent Number: 4,814,238
[45] Date of Patent: Mar. 21, 1989

[54] MAGNETO-OPTICAL RECORDING MEDIUM

[75] Inventors: Shinsuke Tanaka, Yokohama; Nobutake Imamura, Kamakura; Chuichi Ota, Chofu, all of Japan

[73] Assignee: Kokusai Denshin Denwa Kabushiki Kaisha, Tokyo, Japan

[21] Appl. No.: 77,002

[22] Filed: Jul. 21, 1987

Related U.S. Application Data

[63] Continuation of Ser. No. 894,433, Jul. 30, 1986, abandoned, Continuation of Ser. No. 658,171, Oct. 5, 1984, abandoned.

[30] Foreign Application Priority Data

Oct. 6, 1983 [JP] Japan ................................ 58-185906

[51] Int. Cl.$^4$ .............................................. G11B 7/24
[52] U.S. Cl. .................... 428/692; 365/122; 369/13; 369/288; 428/694; 428/900
[58] Field of Search ............. 428/694, 692, 900; 365/122; 369/13, 288; 360/131, 134

[56] References Cited

U.S. PATENT DOCUMENTS 3,949,387 4/1976 Chaudhari .................... 340/174 TF
3,965,463 6/1976 Chaudhari et al. ........... 340/174 TF

FOREIGN PATENT DOCUMENTS 3317101 11/1983 Fed. Rep. of Germany .

Primary Examiner—Paul J. Thibodeau
Attorney, Agent, or Firm—Emmanuel J. Labato; Robert E. Burns

[57] ABSTRACT

A magneto-optical recording medium, which comprises a thin film constituted of an amorphous alloy $(R_xTM_{1-x})_{1-y}A_y$ (where the element material R is at least one rare earth element, the element material TM at least one 3d transition metal and the element material A at least one semi-metal-semiconductor element) and having an easy axis of magnetization in a direction perpendicular to the film surface, the atomic ratio being $0.15 \leq xx \leq 0.35$ and $0.00 < y \leq 0.20$.

9 Claims, 1 Drawing Sheet

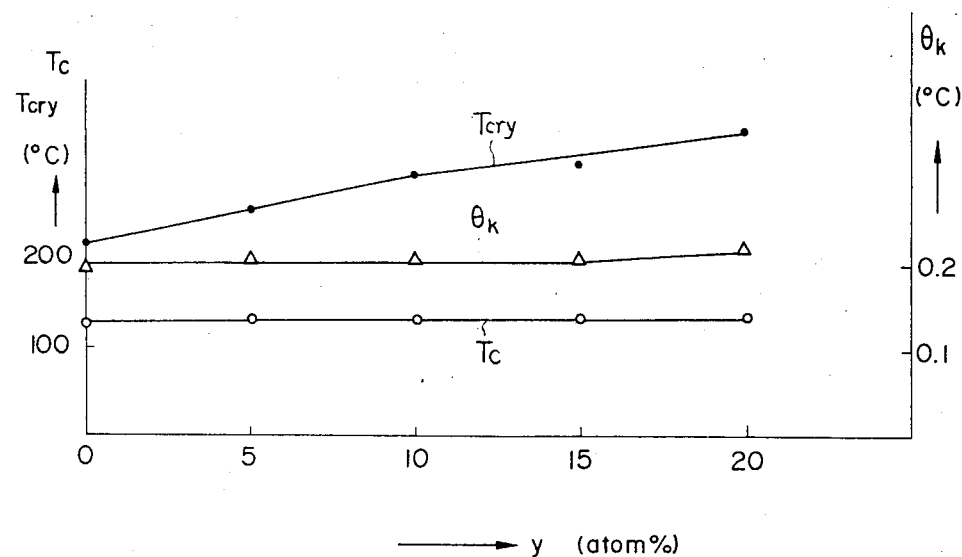

MAGNETO-OPTICAL RECORDING MEDIUM

This is a continuation of our copending application Ser. No. 894,433, filed July 30, 1986, which has been abandoned upon the filing of the present continuation, which in turn is a continuation of Ser. No. 658,171, filed 10-5-84 and now abandoned.

BACKGROUND OF THE INVENTION

The present invention relates to a magneto-optical recording medium for use as a magneto-optical memory, a magnetic recording and display cell and so forth and, more particularly, to a magnetic thin film recording medium which has an easy axis of magnetization in a direction perpendicular to the film surface and permits recording of information by forming a reversed magnetic domain of a circular or any other arbitrary configuration and readout of the information through utilization of a magnetic-optical effect such as the magnetic Kerr effect.

With ferromagnetic thin films which have an easy axis of magnetization in a direction perpendicular to their film surface, it is possible to form a small reversed magnetic domain of a magnetic polarity reverse to the uniform magnetization polarity in the film surface uniformly magnetized to the south or north magnetic pole. By making the presence and absence of such a reversed magnetic domain correspond to states "1" and "0", respectively, such ferromagnetic thin film can be employed as high density magnetic recording media. Of such ferromagnetic thin films, those which have a large coercive force at room temperature and a Curie temperature or magnetic compensation temperature relatively close to room temperature permit recording of information by forming reversed magnetic domains at arbitrary positions with a light beam through utilization of the Curie temperature or magnetic compensation temperature, and they are generally used as beam-addressable files.

Conventionally known ferromagnetic thin films which have an easy axis of magnetization in the direction perpendicular to the film surface and can be used as beam-addressable files are polycrystalline metallic thin films represented by MnBi, amorphous metallic thin films such as Gd-Co, Gd-Fe, Td-Fe, Dy-Fe, etc., and compound single crystal thin films represented by GIG; however, they have such advantage and disadvantage as described below. The polycrystalline metallic thin films which utilize the Curie temperature for a writing operation, represented by MnBi, are excellent as magnetic recording media, in that they have a large coercive force of several kilooersteds at the room temperature, but are defective in that they call for a great amount of energy for a writing operation because of their high Curie temperature ($T_c = 360°$ C. in MnBi). Moreover, since polycrystalline metals are used, these thin films must be formed to have a stoichiometric composition, which introduces technical difficulties in their fabrication. The amorphous metallic thin films which effect a writing operation through utilization of the magnetic compensation point, such as Gd-Co and Gd-Fe, possess advantages; that they can be formed on an arbitrary substrate since amorphous materials are used, and their magnetic compensation temperatures can be freely controlled to some extent by the addition of a small amount of impurity, but these thin films have a shortcoming in that their coercive forces at the room temperature are small (300 to 500 Oe), resulting in recorded information being unstable. In addition, it is necessary, for the fabrication of thin films of such a small coercive force, to control their composition within about 1 atom%, and hence these thin films are not easy to fabricate.

Further, the compound single crystal thin films, represented by GIG, have the serious disadvantage of very high manufacturing costs as compared with the other thin films.

On the other hand, amorphous alloy thin films containing 15 to 35 atom% of Tb or Dy, such as TbFe and DyFe, which have been proposed as new magnetic thin film recording media free from such defects as described above, have the following merits:

(1) Since each one of them has an easy axis of magnetization in the direction perpendicular to the film surface and has a large coercive force of several kilooersteds at room temperature, information can be recorded with high density and the recorded information is very stable.

(2) The coercive force is large and magnetic domains of desired configuration can be established.

(3) Since each one of them has a large coercive force over a wide range of composition and has excellent characteristics as recording media over a wide range of composition, they need not be severely restricted in composition and can be fabricated with ease and with good yield.

(4) Since the Curie temperature TbFe is as low as 120° C. and of DyFe is as low as 60° C., a thermal writing operation utilizing the Curie temperature can be effected with a very small amount of energy.

However, these amorphous alloy thin films present a problem of thermal stability as they are amorphous. Amorphous, material has a metastable phase in terms of energy, but when the temperature rises, it undergoes an irreversible transformation into a crystalline state. The temperature at which it becomes crystalline is referred to as the crystallization temperature $T_{cry}$. The thin film, once crystallized, comes to have an easy axis of magnetization in the direction along its surface and loses the function of an optical magnetic recording medium. Accordingly, in case of writing information in the magneto-optical memory, a temperature above the Curie temperature $T_c$ is needed, but the temperature should not be raised above the crystallization temperature $T_{cry}$. This imposes severe limitations on the power of light for a writing operation. For example, TbFe has a Curie temperature nearly equal to 130° C. and a crystallization temperature of 220° C., and hence there is a relatively large temperature difference (a margin) therebetween. In recording media of GdTbFe systems or TbFeCo systems Gd or Co may be included for the purpose of improving their reproducing characteristics; however, the Curie temperature rises to the vicinity of 200° C. and the crystallization temperature undergoes no appreciable change, leaving a very narrow margin of recording light power.

Furthermore, crystallization of the recording medium is not always caused by single light irradiation for a writing operation; in a case where the recording medium is repeatedly used, heat from the light irradiation for each writing operation is accumulated, so that even if the recording medium has a low Curie temperature $T_c$, its temperature would exceed its crystallization temperature $T_{cry}$, resulting in the medium being crystallized.

These properties are serious defects when the abovesaid thin films are employed as media of the magneto-optical memory.

SUMMARY OF THE INVENTION

The present invention is intended to overcome the problem of crystallization of the conventional magneto-optical recording media, and it is an object of the present invention to provide a magneto-optical recording medium of improved thermal stability which has an elevated crystallization temperature while retaining the recording and reproducing characteristics of the prior art recording media.

The feature of the present invention resides in a thin film which is constituted by an amorphous alloy which has an easy axis of magnetization in a direction perpendicular to the film surface, a Curie temperature $T_c$ in the range of from 100° to 250° C. and a composition expressed by the following general formula:

$$(R_xTM_{1-x})_{1-y}A_y \qquad (1)$$

where $0.15 \leq x \leq 0.35$ and $0.00 < y \leq 0.20$ and where the element material R is a rare earth element, the element material TM a 3d transition metallic element and the element material A a semimetal-semiconductor element for stabilizing the amorphous property. Typically, there are Gd, Tb, Dy, Sm, etc. for the element material R; Fe, Co, Ni, etc. for the element material TM; and B, C, Si, P, etc. for the element material A. In the composition (1), each of the element materials R, TM and A need not always be a single element but may also be plural. An example of a composition in which each of them has two elements is $[(Gd,Tb)_x(Fe,Co)_{1-x}]_{1-y}(B, P)_y$.

BRIEF DESCRIPTION OF THE DRAWING

The present invention will be described in detail below with reference to the accompanying single drawing, which is a characteristic diagram explanatory of the principle of the present invention.

DETAILED DESCRIPTION

Next, a description will be given of the composition ranges of x and y in the composition (1). In order to provide sufficient magnetic anisotropy for magnetizing the film in the direction perpendicular to the film surface, it is necessary to make the thin film amorphous. This requirement can be fulfilled by fabricating the thin film, through a sputtering or vacuum evaporation technique, on a substrate held below the room temperature. For stable magnetization in the direction perpendicular to the film surface to retain a sufficient coercive force, it is necessary to select the value x in the abovesaid composition range. Next, a description will be given of the value y, using $(Tb_{0.22}Fe_{0.75})_{1-y}B_y$. In case of varying the atomic ratio of the element material B in the range of 0 to 20 atom%, the Curie temperature $T_c$, the Kerr rotation angle $\theta_k$ and the crystallization $T_{cry}$ bear such relationships as given in Table 1, which are shown in the in FIGURE. As will be seen from them, the Curie temperature $T_c$ and the Kerr rotation angle $\theta_k$ undergo no appreciable changes with the amount y of the element material B added. In other words, it is possible to raise only the crystallization temperature $T_{cry}$ of the recording medium composed of $(Tb_{0.22}Fe_{0.75})$ by selective addition of the element material B with prectically no variations in its recording and reproducing characteristics.

TABLE 1

| y | 0.00 | 0.05 | 0.10 | 0.15 | 0.20 |
|---|---|---|---|---|---|
| $T_c$ (°C.) | 130 | 131 | 130 | 134 | 135 |
| $\theta_k$ (°C.) | 0.20 | 0.20 | 0.21 | 0.20 | 0.22 |
| $T_{cry}$ (°C.) | 220 | 260 | 290 | 320 | 350 |

The relationships shown in Table 1 and the FIGURE are common to semimetal-semiconductor elements. Incidentally, the addition of the element material B in excess of 20 atom% results in an elevation of the Curie temperature $T_c$, and hence is inadvisable, and the addition of too much of element B impairs the function of the recording medium.

As described above, according to the present invention, it is possible to offer a thermally stable recording medium the crystallization of which can be raised by the addition of a semimetal-semiconductor element, without imparing excellent recording and reproducing characteristics of the existing magneto-optical recording media.

While the present invention has been described mainly in connection with TbFe, the invention also produces the same effect with regard to recording media of the RE-TM systems such as GdTbFe and TbFeCo, as referred to above.

As has been described in the foregoing, the magneto-optical recording medium of the present invention retains the features of the well-known amorphous alloy thin films, i.e. TbFe, DyFe, etc., such as an easy axis of magnetization in the direction perpendicular to the film surface, a large coercive force at the room temperature, a Curie temperature close to the room temperature and easy fabrication, and in addition, its temperature is higher than those of the conventional thin films. Accordingly, by employing the recording medium of the present invention as a storage medium of a magneto-optical memory which effects a writing operation through use of a light beam and readout through utilizing the magnetic Kerr effect, such as a so-called beam addressable file memory, it is possible to implement a memory device which is capable of extremely high recording density, which has a large SN ratio and which is very stable when used repeatedly. Moreover, the writing operation can be effected not only by a light beam but also by any means for supplying energy necessary for producing a reversed magnetic domain, such as a needle-type magnetic head, a heat pen and an electron beam.

What we claim is:

1. A magneto-optical recording medium comprising a thin film constituted of an amorphous alloy of the formula $(R_xTM_{1-x})_{1-y}A_y$, where the element material R is at least one rare earth element, the element material TM is at least one 3d transistion metal, and the element material A is a semimetal-semiconductor of Si; and having an easy axis of magnetization in a direction perpendicular to the film surface, the atomic ratio being $0.15 \leq x \leq 0.35$ and $0.00 < y \leq 0.20$, and said element material A being present in a quantity effective to raise the crystallization temperature $T_{cry}$ to a level so that margins of the Curie temperature and the crystallization temperature necessary for recording are increased thereby effectively improving thermal stability of the thin film, whereby recordings are thermally stable.

2. A magneto-optical recording medium according to claim 1, in which the element material R is at least one element selected from the group of Gd, Tb, Dy and Sm.

3. A magneto-optical recording medium according to claim 1, in which the element material TM is at least one element selected from the group of Fe, Co and Ni.

4. A magneto-optical recording medium according to claim 1, in which the amorphous alloy is $[(Gd,Tb)_x,(Fe,Co)_{1-x}]_{1-y}(C,P)_y$.

5. The magneto-optical recording medium according to claim 1 in which the atomic ratio expressed by x and y is: $0.15 \leq x \leq 0.35$ and $0.05 \leq y \leq 0.20$.

6. A magneto-optical recording medium comprising a thin film constituted of an amorphous alloy having an easy axis of magnetization in a direction perpendicular to the film surface and having the formula $$(Tb_xTM_{1-x})_{1-y}A_y$$

wherein: TM is at least one 3d transition metal selected from Fe and Co;
A is a semimetal-semiconductor element of Si; and the atomic ratio expressed by
x and y is $0.15 \leq x 23\ 0.35$ and $0.05 \leq y \leq 0.20$ and wherein the element A is present in a quantity effective to raise the crystallization temperature $T_{cry}$ to a level such that margins of the Curie temperature and the crystallization temperature necessary for recording are increased effectively improving thermal stability of the thin film, whereby repetitive recordings are thermally stable.

7. The magneto-optical recording medium according to claim 6 wherein the amorphous alloy is of the formula $$(Tb_xFe_{1-x})_{1-y}A_y$$

wherein A is a semimetal-semiconductor element of Si.

8. A magneto-optical recording medium comprising a thin film constituted of an amorphous alloy having an easy axis of magnetization in a direction perpendicular to the film surface and having the formula $$(R_xTM_{1-x})_{1-y}A_y$$

wherein: R is at least one rare earth element selected from Gd, Tb, Dy and Sm;
TM is at least one 3d transition metal selected from Fe and Co;
A is a semimetal-semiconductor element of Si; and the atomic ratio expressed by
x and y is $0.15 \leq x \leq 0.35$ and $0.05 \leq y \leq 0.20$ and wherein the element A is present in a quantity effective to raise the crystallization temperature $T_{cry}$ to a level such that margins of the Curie temperature and the crystallization temperature necessary for recording are increased, effectively improving thermal stability of the thin film, whereby repetitive recordings are thermally stable.

9. The magneto-optical recording medium according to claim 8 wherein R is at least one rare earth element selected from Gd and Tb and TM is Fe.

* * * * *